March 10, 1964 P. H. SHERRON 3,124,054

TELEPHONE BOOTH CEILING STRUCTURE

Filed Nov. 21, 1961

INVENTOR.
PERCIVAL H. SHERRON
BY
Busser, Smith & Harding
ATTORNEYS 3,124,054

TELEPHONE BOOTH CEILING STRUCTURE

Percival H. Sherron, Jamaica, N.Y. (% Sherron Metallic Corp., 1201 Flushing Ave., Brooklyn 37, N.Y.)

Filed Nov. 21, 1961, Ser. No. 153,956
7 Claims. (Cl. 98—33)

This invention relates to ceiling structures for telephone booths.

It is common practice to provide telephone booth ceiling structures which comprise a ceiling chamber having mounted therein means for illuminating the telephone booth and means for ventilating the telephone booth. It is the general object of this invention to provide a telephone booth ceiling structure of this type having an improved construction and arrangement of parts so as to provide good illumination and ventilation of the telephone booth as well as easy access to the ceiling chamber. Proper lighting and ventilation, of course, contribute to the general comfort of those using the telephone booth. The construction of the ceiling structure so as to permit easy access to the ceiling chamber aids the installation of electrical equipment and wiring for the illumination and ventilating means. These features of good illumination and ventilation and easy access to the ceiling chamber are essential requirements for the construction of a satisfactory telephone both ceiling structure.

Another object of this invention is to provide a ceiling structure of the indicated type constructed to permit easy installation and replacement of the illumination means from the bottom of the ceiling structure. To this end, the illumination means is mounted on a hinged ceiling panel which may be pivoted downwardly for the installation and replacement of the illumination means.

The above and other objects and features of this invention will become apparent from a consideration of the following description read in conjunction with the accompanying drawings in which.

Figures 1, 2, 3, 4:
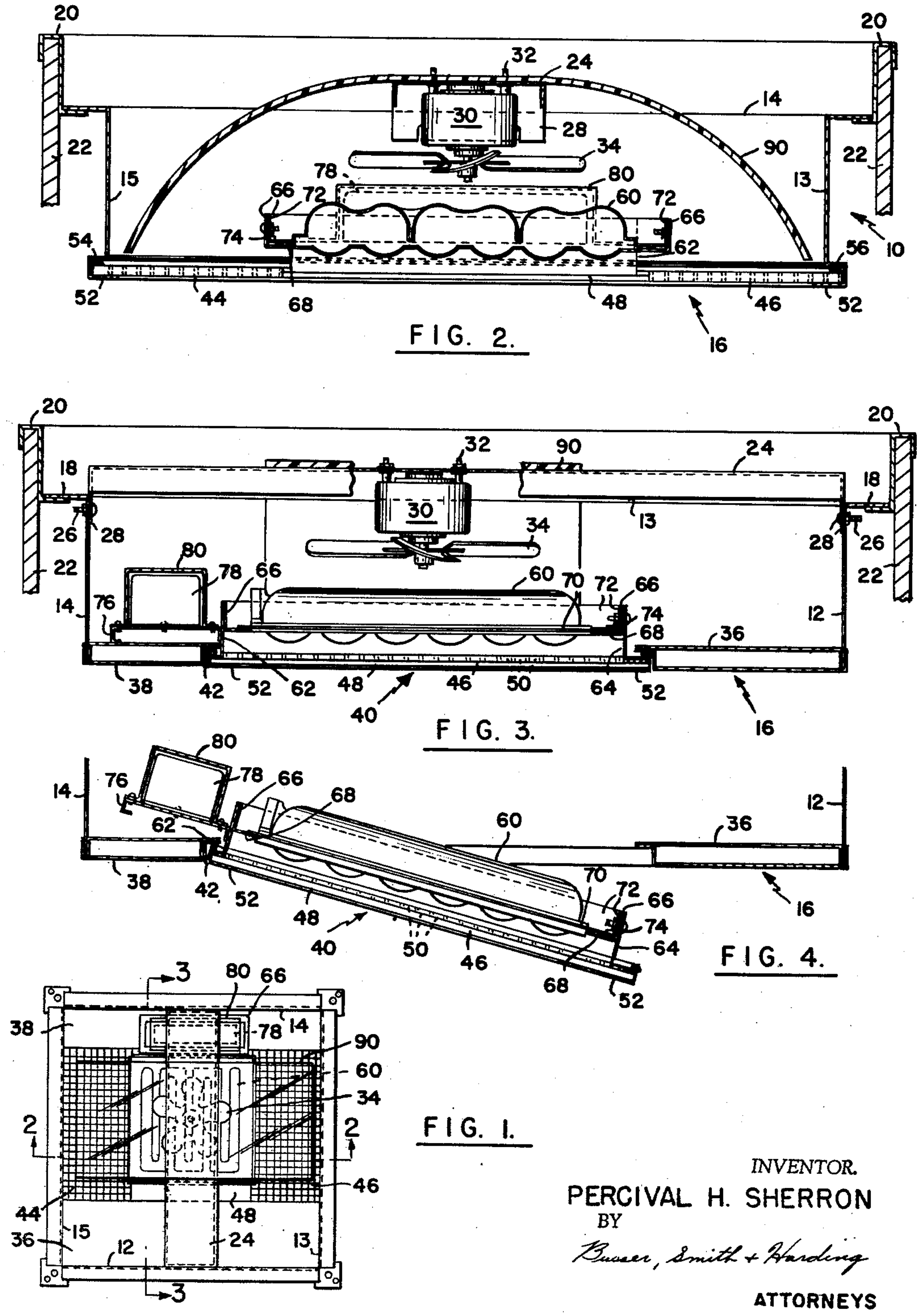
FIGURE 1 is a plan view of the ceiling structure in accordance with this invention with the top cover removed.
FIGURE 2 is a sectional view taken on the line 2—2 of FIGURE 1.
FIGURE 3 is a sectional view taken on line 3—3 of FIGURE 1.
FIGURE 4 is a fragmentary view similar to FIGURE 3 with the parts arranged in a different position.

The telephone booth ceiling structure shown in FIGURES 1 to 3 comprises a rectangular housing 10 which includes four sides 12, 13, 14 and 15 and a bottom indicated generally at 16 which serves as the ceiling for the telephone booth. Sides 12 and 14 extend respectively across the front and rear of the telephone booth. The sides have outwardly extending flanges 18 adapted to rest on horizontally extending flanges formed on the inner legs of channel members 20. Channel members 20 are adapted to be supported by the side panels 22 of the telephone booth as shown in FIGURE 3. The telephone booth cover (not shown) rests on the upper portion of channel members 20. The housing 10 is supported on the telephone both structure by means of the flanges 18, the supporting arrangement being more fully described in my Patent No. 2,896,694, issued November 1, 1960.

A channel member 24 is attached to the front and rear sides 12 and 14 of the housing 10 by means of suitable screws 26 which cooperate with downwardly turned flanges 28 at the ends of member 24 and the corresponding front and rear sides 12 and 14. The member 24 is thus supporting by the sides of the ceiling structure and extends transversely of the telephone booth from front to back.

The ventilating means comprises a fan motor 30 which is mounted on the member 24 by suitable mounting screws 32 and is adapted to drive the fan blades 34 which are fixedly mounted on the lower end of the motor shaft extending downwardly from the motor 30. Screws 32 cooperate with suitable nuts and washers to mount the motor 30 in a well-known manner.

The ceiling 16 comprises a front panel 36 and a rear panel 38 extending horizontally between the lower ends of the upright sides of housing 10. The panel member 36 is secured to the sides 12, 13 and 15 and the rear panel 38 is secured to the sides 13, 14 and 15, as by welding. Panels 36 and 38 are comprised of spaced upper and lower members, the latter being bent upwardly to meet the upper members and then horizontally in contact therewith to form recesses and inwardly projecting ledges. Panels 36 and 38 are thus adapted to accommodate an intermediate panel 40 which extends between the spaced panels 36 and 38.

The frame of the panel 40 is hinged at 42 to the inner edge of the rear panel 38. As is best shown in FIGURES 1 and 2, hinged panel 40 is comprised of a pair of outer sections 44 and 46 and an intermediate section 48 extending between the spaced outer sections 44 and 46. The intermediate section 48 is preferably formed of translucent plastic material having substantial resistance to breakage, such as, for example, "Plexiglas." Each of the sections 44 and 46 is provided with a plurality of rectangular openings 50 to provide passageways for the flow of air between the telephone booth compartment and the ceiling chamber. The sections 46 and 48 thus present an "egg crate" or checkerboard appearance.

The sections of hinged panel 40 are secured together and supported by a frame comprising a border 52 around the edges of the panel 40. The border 52 is L-shaped in cross-section with one leg thereof extending longitudinally of the panel 40 to provide support for the marginal areas thereof. A pair of angular retaining members 54 and 56 are attached, as by welding, to the border 52 and extend along the outer edges of the panels 44 and 46 and are adapted to retain these edges in fixed relation relative to the border 52 as is shown in FIGURE 2.

The illuminating means in accordance with this invention comprises a substantially square panel 60 of fluorescent lighting means. Panel 60 is relatively thin compared to previous telephone booth lighting means and provides a very effective source of light by reason of the large source area. Also, this fluorescent panel provides uniform light distribution.

Panel 60 is supported on the hinged panel 40 immediately above translucent section 48 by a frame comprising a pair of brackets 62 and 64 connected to border 52 by suitable mounting screws and nuts. Bracket 62 has an angular lower end contacting the upper face of section 48 and the inner side of the transversely extending leg of border 52 at a location extending along the hinged edge of section 48. The lower end of bracket 62 is secured to border 52 by suitable screws cooperating with a leg of the border 52 and a leg of hinge 42. Bracket 64 has an angular lower end contacting the upper face of section 48 and the inner side of the transversely extending leg of the border portion extending along the edge of section 48 opposite the hinged edge. The lower end of bracket 64 is secured to border 52 by suitable screws cooperating with the transverse leg of border 52.

Secured to the upper ends of brackets 62 and 64 is a rectangular frame member 66 which extends between the brackets 62 and 64. Frame member 66 is angular in cross section and has a leg 68 projecting inwardly and parallel to ceiling panel 40. Frame member 66 defines a central opening which is adapted to receive the lighting panel 60 which has an outwardly projecting flange 70 adapted to rest on the upper face of the leg 68 when the lighting panel is placed on the frame member 66 in its operating position. In order to secure the lighting panel 60 in its operating position, an angular retaining frame 72 is mounted on the inner side of frame member 66, as by suitable mounting screws. The retaining frame 72 has a leg contacting the upper face of the flange 70 along three sides of the lighting panel 60. The retaining frame 72 does not extend along the portion of frame member 68 adjacent the bracket 62 (FIGURE 3). The contact of leg 74 with the flange 70 on three sides of the lighting panel 60 is sufficient to fix the lighting panel 60 securely to its supporting framework.

The lighting panel 60 is easily removed from its assembled position on the hinged panel 40 by simply disassembling the frame member 72 by removal of the mounting screws therefor. In order to provide easy access to the lighting panel 60 for installation thereof, the lighting assembly comprising the hinged panel 40, the lighting panel 60 and the supporting frame therefor are swung downwardly about the pivotal hinge 42 as is illustrated in FIGURE 4.

Means are provided for counterbalancing the lighting assembly so that th panel 40 is normally in the closed position shown in FIGURES 2 and 3. To this end, a channel member 76 is secured to the bracket 62 by suitable means and extends laterally therefrom toward the left side of hinge 42 as viewed in FIGURES 3 and 4. The usual electrical ballast means, indicated generally at 78, for controlling the illuminating means is mounted, as by suitable mounting screws, on the channel 76. A cover 80 is provided for enclosing the ballast means 78 which includes the usual electrical devices for operating the lighting means, such as ballast transformers, starters, and appropriate electrical connections to the lighting means and a source of electrical energy.

The weight of the ballast means 78 serves to hold the lighting assembly in the closed position shown in FIGURES 2 and 3. The ballast means 78 thus serves as a counterweight for the lighting assembly and counterbalances the weight of the hinged panel 40, the lighting panel 60 and the supporting frame therefor. While the weight of the ballast means will generally be sufficient to effect this counterbalancing, additional counterweights may be added on the channel 76 if necessary. The lighting assembly may thus be easily swung downwardly about pivot 42 in order to provide access to the interior of the ceiling chamber or to permit installation or repair of lighting means 60.

Means are provided for directing the flow of the air propelled by the fan directly from the openings 50 in panels 44 and 46 and the fan blades to thereby provide effective ventilation. To this end, a baffle 90 is mounted on the upper end of channel 24. Baffle 90 is arcuate in cross-section and terminates adjacent the upper face of the ceiling 16 as is shown in FIGURE 2. Baffle 90 has open ends facing the front and rear sides 12 and 14 of the housing 10. Baffle 90 is preferably made of a translucent material, such as "Plexiglas." One or more of the sides of the ceiling structure is provided with a suitable screened opening communicating with louvers in the telephone booth side wall as is well known to provide circulation passageways between the ceiling chamber and the exterior of the telephone booth. An example of this well known construction is the structure disclosed in my Patent No. 2,958,402.

It will thus be apparent that with the fan blades 34 rotating to provide an updraft through the telephone booth compartment, air will be drawn through the openings 50 in each of the panels 44 and 46 and directed by the baffle 90 towards the fan blades whereby effective ventilation results. The circulating air leaves the ceiling chamber by way of the circulation passageways (not shown). Of course, the path of air flow will be in a reverse direction if the fan blades are operated to provide a downdraft. It will be noted that by reason of the arrangement in which the open panels 44 and 46 are positioned laterally on opposite sides of the lighting means 60, which is directly beneath the fan, the lighting means will not present any substantial interference to the air flow.

It will be evident that various modifications in the construction and arrangement of parts may be made in the structure embodying the invention as disclosed herein without departing from the scope of the invention as set forth in the following claims.

What is claimed is:

1. A telephone booth having a ceiling structure comprising a housing adapted to be mounted at the top of the telephone booth and including a horizontally extending panel means providing the telephone booth ceiling, said panel means including a light transmitting panel, means pivotally supporting said light transmitting panel for swinging movement downwardly from the horizontal position thereof, means for illuminating the telephone booth including a light producing panel, and means for mounting said illuminating means on said light transmitting panel for movement therewith, said light producing panel being mounted on the upper side of said light transmitting panel and being smaller than said light transmitting panel in the horizontal extent to avoid interference with the booth ceiling during conjoint pivotal movement of said light transmitting panel and said light producing panel.

2. A telephone booth having a ceiling structure comprising a housing adapted to be mounted at the top of the telephone booth and including a horizontally extending panel means providing the telephone booth ceiling, said panel means including a light transmitting panel, means pivotally supporting said light transmitting panel for swinging movement downwardly from the horizontal position thereof, means for illuminating the telephone booth, means for mounting said illuminating means on said light transmitting panel for movement therewith, the weight of said illuminating means biasing said light transmitting panel toward movement in one direction about said pivot, and counterweight means mounted on said light transmitting panel for movement therewith, said counterweight means being arranged to bias said light transmitting panel against the bias of said illuminating means and being heavy enough for counterbalancing the bias of said illuminating means.

3. Ceiling structure as claimed in claim 2 wherein said counterweight means comprises the electrical ballast means for said illuminating means.

4. A telephone booth having a ceiling structure comprising a housing adapted to be mounted at the top of the telephone booth and including a horizontally extending panel means providing the telephone booth ceiling, said panel means including a light transmitting panel, means pivotally supporting said light transmitting panel for swinging movement downwardly from the horizontal position thereof, means for illuminating the telephone booth, means for mounting said illuminating means on said light transmitting panel for movement therewith, air circulating means, and means mounting said air circulating means on said housing above said illuminating means in opposed relation thereto, said ceiling panel means including ventilating panel means comprising a plurality of openings for the passage of air through the ceiling panel means, said ventilating panel means being located laterally on both sides of said illuminating means whereby said illuminating means does not interfere with the flow of air through said ceiling panel means.

5. A telephone booth having a ceiling structure comprising a housing adapted to be mounted at the top of the telephone booth and including a horizontally extending panel means providing the telephone booth ceiling, said panel means including a light transmitting panel, means pivotally supporting said light transmitting panel for swinging movement downwardly from the horizontal position thereof, means for illuminating the telephone booth, means for mounting said illuminating means on said light transmitting panel for movement therewith, air circulating means, means mounting said air circulating means on said housing above said illuminating means in opposed relation thereto, said ceiling panel means including ventilating panel means comprising a plurality of openings for the passage of air through the ceiling panel means, said ventilating panel means being located laterally of said illuminating means whereby said illuminating means does not interfere with the flow of air through said celing panel means, and baffle means positioned above said ceiling panel means for directing air between the openings in said ventilating panel means and said air circulating means.

6. A telephone booth having a ceiling structure comprising a housing adapted to be mounted at the top of a telephone booth, said housing having a horizontally extending panel means providing the telephone booth ceiling, air circulating means, and means mounted on said housing beneath said air circulating means and above said ceiling panel means for illuminating the telephone booth, said ceiling panel means including a ventilating panel means comprising a plurality of openings for the passage of air through the ceiling panel means, said ventilating panel means being located laterally of said illuminating means whereby said illuminating means does not interfere with the flow of air through said ceiling panel means.

7. A telephone booth having a ceiling structure comprising a housing adapted to be mounted at the top of a telephone booth, said housing having a horizontally extending panel means providing the telephone booth ceiling, air circulating means, means mounted on said housing beneath said air circulating means and above said ceiling panel means for illuminating the telephone booth, said ceiling panel means including ventilating panel means comprising a plurality of openings for the passage of air through the ceiling panel means, said ventilating panel means being located laterally of said illuminating means whereby said illuminating means does not interfere with the flow of air through said ceiling panel means, and baffle means positioned above said ceiling panel means for directing air between said openings in said ventilating panel means and said air circulating means.

References Cited in the file of this patent

UNITED STATES PATENTS

| | | |
|---|---|---|
| 2,628,550 | King | Feb. 17, 1953 |
| 2,982,196 | Sherron | May 2, 1961 |